United States Patent [19]

Beasley

[11] 4,360,247

[45] Nov. 23, 1982

[54] EVANESCENT FIBER OPTIC PRESSURE SENSOR APPARATUS

[75] Inventor: J. Donald Beasley, Arlington Heights, Ill.

[73] Assignee: Gould Inc., Rolling Meadows, Ill.

[21] Appl. No.: 225,892

[22] Filed: Jan. 19, 1981

[51] Int. Cl.³ .......................... G01L 9/00; G02B 7/26
[52] U.S. Cl. ................................ 350/96.15; 73/705;
    73/DIG. 11; 350/96.29; 367/149; 250/227
[58] Field of Search .............. 350/96.15, 96.29, 96.34;
    367/174, 140, 141, 149; 73/705, 800, DIG. 11;
    455/612

[56] References Cited

U.S. PATENT DOCUMENTS

| | | | |
|---|---|---|---|
| 3,408,131 | 10/1968 | Kapany | 350/96.29 |
| 4,021,097 | 5/1977 | McMahon | 350/96.15 |
| 4,053,204 | 10/1977 | Miller | 350/96.31 |
| 4,054,366 | 10/1977 | Barnoski et al. | 350/96.15 |
| 4,078,432 | 3/1978 | Stewart | 73/705 |
| 4,086,484 | 4/1978 | Steensma | 455/608 |
| 4,113,345 | 9/1978 | Gerndt | 350/96.15 |
| 4,128,301 | 12/1978 | Burns et al. | 350/96.15 |
| 4,136,929 | 1/1979 | Suzaki | 350/96.15 |
| 4,182,935 | 1/1980 | Chown | 370/4 |
| 4,264,126 | 4/1981 | Sheem | 350/96.15 |

OTHER PUBLICATIONS

U.S. Ser. No. 11,976, filed 11-1854, Sheem.
U.S. Ser. No. 106,761, filed 8-1870, Stowe et al.
U.S. Ser. No. 106,762, filed 12/26/79, Stowe et al.
U.S. Ser. No. 106,763, filed 12/26/79, Stowe et al.

*Primary Examiner*—Paul L. Gensler
*Attorney, Agent, or Firm*—H. Huberfeld; B. L. Tummino

[57] ABSTRACT

An apparatus is disclosed for optically sensing pressure using evanescent wave coupling between two fiber optics. A support base with a channel holds the two waveguides, one on top of the other, with the portion of the waveguide having the cladding material removed in the channel. An upper member having a diaphragm is attached to the support base. The diaphragm has a pedestal attached that is in slight contact with one of the waveguides. When pressure is exerted upon the diaphragm, the waveguides are forced closer together thus affecting the amount of evanescent coupling therebetween.

7 Claims, 4 Drawing Figures

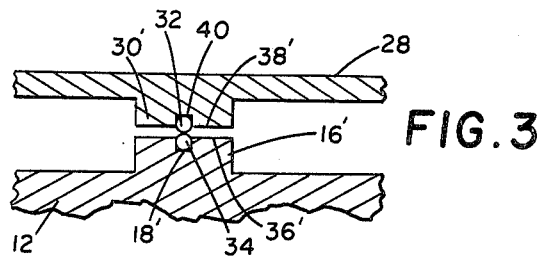
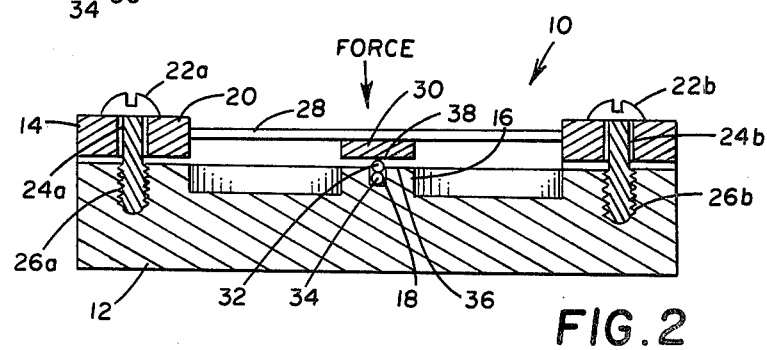
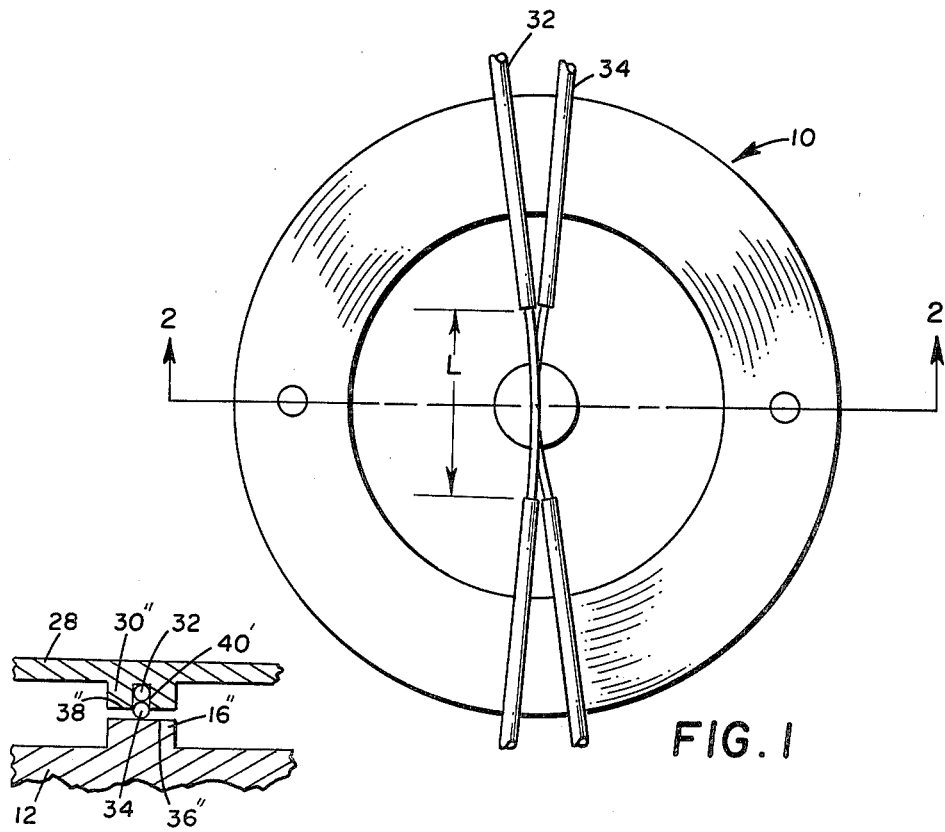

EVANESCENT FIBER OPTIC PRESSURE SENSOR APPARATUS

BACKGROUND OF THE INVENTION

The present invention relates to fiber optic pressure sensors and is particularly directed to an apparatus that permits pressure sensing by sensing the change in evanescent coupling between two optical fibers.

The prior art teaches various methods for accomplishing pressure sensing using optical fibers. One such method transmits a source signal through an optical fiber and directs the source beam against a reflective membrane. The reflective membrane is in communication with the acoustic or pressure signals to be monitored. Another optical fiber is located in such a position as to receive the reflected signal from the reflective membrane. When the reflective membrane is subjected to pressure signals the membrane will vibrate, thus causing the angle of reflection at the membrane to vary and thus the reflected light will change. The reflected light is partially collected by the second optical fiber which then transmits the changing optical signal back to a decoding system.

Another system taught by the prior art for detecting pressure waves using optical fibers is to vary the optical coupling coefficient between two fibers in response to the pressure waves. An input fiber carries a steady state optical signal which may either be continuous or pulsed. This input signal is then coupled to an output optical fiber via a coupling network. The coupling means is subject to the pressure variations such that when pressure occurs on the coupling means the energy will no longer be in direct coupling with the output fiber. Such a system is taught in U.S. Pat. No. 4,071,753 to Fulenwider et al.

OBJECTS OF THE INVENTION

An object of the present invention is to provide an apparatus that utilizes evanescent wave coupling to detect pressure.

Another object of the present invention is to provide an optical transducer which may be used as a microphone.

The above objects are given by way of example. Thus other desirable objectives and advantages achieved by the invention may occur to those skilled in the art. The scope of the invention is to be limited only by the appended claims.

BRIEF SUMMARY OF THE INVENTION

The above objects and other advantages are achieved by the present invention. An apparatus is provided that utilizes evanescent wave coupling to detect pressure variations. Two optical fibers have all but a remnant of their cladding removed along a finite longitudinal length of the fibers. The apparatus is a circular holder that has a longitudinal slot in its base to hold the unstripped portion of the fiber optic cables. The center portion of the holder has a pedestal with a slot in it which receives the stripped lengths of the two fiber optic cables. A diaphragm-cover is mounted on top of the holder so as to permit the diaphragm to be free to move under pressure waves. The diaphragm has a center pedestal which aligns with the pedestal in the base holder, the two pedestals being dimensioned so as to transmit the pressure waves from the diaphragm pedestal to compress the optical fibers together. This force transmitting pedestal of the diaphragm forces a change in the spatial relationship between the cores of the two optical fibers thus affecting the amount of evanescent coupling therebetween. The amount of optical energy coupled from one core to the other core becomes larger as the two cores are brought closer together. Pushing the two cores together through the residual plastic cladding material causes the degree of coupling to change. This behavior can be used to convert physical motion or pressure applied to the diaphragm into an optical signal in the secondary fiber to which optical energy is coupled from the primary fiber which is energized by a light source such as a laser.

DESCRIPTION OF THE DRAWINGS

FIG. 1 is a top view of the apparatus of the present invention with the upper member removed;

FIG. 2 is a side cross-sectional view along lines 2—2 of FIG. 1.

FIG. 3 is a side cross-sectional view of another embodiment of the present invention; and FIG. 4 is a side cross-sectional view of yet another embodiment of the present invention.

DESCRIPTION OF THE PREFERRED EMBODIMENTS

A description of the invention follows which refers to the drawings in which like reference numerals denote like elements of structure in each of the several figures. In general the terms "optical waveguide" or "optical fiber" will be used herein to refer to a glass transmission line having a core member with cladding members concentrically surrounding the core for transmission by internal reflection at the core-cladding interface of electromagnetic radiation which lies in the optical portion of the electromagnetic spectrum between microwaves and x-rays and including the ultra-violet, visible and infra-red regions.

The figures show a pressure sensor apparatus 10 which has a bottom support 12 and an upper member 14. Although not essential to the present invention, the figures show the support member 12 and the upper member 14 to be circular in shape. Support member 12 has a pedestal 16 which has a channel 18, the purpose of which will be discussed infra. Upper member 14 has a rigid outer member 20 which is used to attach the upper member 14 to the support member 12. The figures show attachment being accomplished by screws 22a and 22b going through bores 24a and 24b of upper member 14 and extending into threaded bores 26a and 26b of support member 12. The invention also contemplates other means of attaching upper member 14 to support member 12 such as epoxy or other adhesive material, welding, etc. Upper member 14 has a diaphragm 28 which extends inwardly and is attached to rigid member 20 of upper member 14. As is shown in the figures, diaphragm 28 will also be circular in shape and will fit within the circular rigid member 20. The diaphragm 28 is made of a material that will be flexed when contacted by pressure or by acoustic waves. Diaphragm 28 has a pedestal 30 fixedly attached to it and located to coincide with pedestal 16 when the upper member 14 and the support member 12 are attached together.

The invention contemplates two optical fibers 32 and 34 both having a portion of their cladding material removed along a specified length L. Enough of the cladding material remains on each of the two optical fibers along the distance L as to permit evanescent wave coupling between the two fiber optics when they are placed in juxtaposition. The two optical fibers are placed onto the support member 12 such that the portions of the fibers which have the cladding material removed fit within channel 18 of pedestal 16. The height of pedestal 16 and the depth of channel 18 are such that when the two optical fibers 32 and 34 are placed within channel 18 they will extend slightly above the surface 36 of pedestal 16. The upper member 14 is then attached to support member 12. The pedestal 30 of upper member 14 is dimensioned such that surface 38 of pedestal 30 will come in slight contact with the outer dimension of the upper fiber optic when there is no external force placed upon diaphragm 28. One of the two optical fibers is used as the light source carrier and the other optical fiber is used as the light receiver. Because of the spatial relation between the two cores there is a certain degree of evanescent coupling from the light source optical fiber to the light receiving optical fiber. The amount of evanescent coupling is dependent upon the spatial relationship between the two cores of the optical fibers. When force is applied to diaphragm 28 from such things as acoustic waves the diaphragm will flex inwardly causing surface 38 of pedestal 30 to compress optical fiber 32 and optical fiber 34 into a closer spatial relationship thus affecting the amount of evanescent coupling therebetween. This increase in the amount of evanescent coupling can be detected in the optical signal in the receiving optical fiber.

FIG. 3 shows another embodiment of the present invention in which the pedestal 30' has a groove 40. The depth of channel 18' of pedestal 16' and of channel 40 of pedestal 30' are less than the outer diameter of optical fibers 34 and 32 respectively. This configuration permits each of the two pedestals 16' and 30' to hold the optical fibers 34 and 32 in juxtaposition. Surfaces 36' and 38' remained spaced apart during the condition when no force is applied to diaphragm 28.

FIG. 4 shows yet another embodiment of the present invention in which pedestal 16" has only a flat surface 36" and pedestal 30" has channel 40' sufficiently dimensioned to hold both optical fibers such that they protrude beyond surface 38".

Although the present invention has been shown with pedestals on both the support member and the diaphragm, the invention also contemplates that the channels may be in the support member or diaphragm themselves.

The present invention has been described with respect to the pressure transmitter always compressing the two optical fibers together when force is applied to the diaphragm. However, it will be appreciated by those skilled in the art that an apparatus can be configured that will separate the two optical fibers when force is applied to have an inverse relationship between force and the amount of evanescent coupling therebetween.

The apparatus of the present invention thus provides an evanescent fiber optic pressure sensing apparatus which does not require complex reflection systems. The present invention can be used as a microphone, hydrophone, or pressure transducer.

This invention has been described with reference to a preferred embodiment. Obvious modifications and alterations will occur to others upon reading and understanding the specification. The intent is to include all such modifications and alterations insofar as they come within the scope of the appended claims or the equivalent thereof.

What is claimed is:
1. An apparatus for sensing pressure by using optical evanescent wave coupling between two fiber optic waveguides of the type having a portion of the cladding material removed along a finite length of each of the fiber optic waveguides defining a coupling region for each waveguide, said two fiber optic waveguides having said coupling regions placed in juxtaposition to effectuate optical evanescent wave coupling therebetween, said apparatus comprising:
support means for supporting said two fiber optic waveguides in a position independent of external pressures;
upper member fixedly attached to said support means, said upper member having a diaphragm that is responsive to external pressures; and
pressure transmitting means fixedly attached to said diaphragm, said pressure transmitting means having a longitudinal channel for holding said coupling region of said two fiber optics in juxtaposition, the width of said channel being approximately equal to the outer diameter of the coupling region of one of said fiber optic waveguides, the depth of said channel being less than the summation of the outer diameters of the coupling regions of said two fiber optic waveguides so that said coupling region of one of said fiber optic waveguides will protrude beyond the surface of said pressure transmitting means and be in slight engagement with said support means when said fiber optic waveguides are placed in said channel of said pressure transmitting means, such that any external pressures upon said diaphragm will cause said pressure transmitting means to force said coupling region of said two fiber optic waveguides into closer communication thus changing the amount of optical evanescent wave coupling therebetween.

2. An apparatus for sensing pressure by using optical evanescent wave coupling between two fiber optic waveguides of the type that have a portion of the cladding material removed along a finite length of each of the fiber optic waveguides defining a coupling region for each waveguide, said two fiber optic waveguides having said coupling regions placed in juxtaposition to effectuate optical evanescent wave coupling therebetween, said apparatus comprising:
support means for supporting said two fiber optic waveguides in a position independent of external pressures, said support means having a longitudinal channel for holding said coupling region of said two fiber optics in juxtaposition, the width of said channel being approximately equal to the outer diameter of the coupling region of one of said fiber optic waveguides, the depth of said channel being less than the summation of the outer diameters of the coupling regions of said two fiber optic waveguides so that said coupling region of one of said fiber optic waveguides will protrude beyond the surface of said support means when said fiber optic waveguides are placed on said support means;
upper member fixedly attached to said support means, said upper member having a diaphragm that is responsive to external pressures; and
pressure transmitting means fixedly attached to said diaphragm and being in slight engagement with the protruding coupling region of the fiber optic in said channel of said support means such that any external pressures upon said diaphragm will cause said pressure transmitting means to force said coupling region of said two fiber optic waveguides into closer communication thus changing the amount of optical evanescent wave coupling therebetween.

3. The apparatus of claim 2 wherein said channel of said support means is in a pedestal extending outwardly from the support means.

4. The apparatus of claim 2 wherein said upper member is fixedly attached to said lower member by means of screws.

5. The apparatus of claim 1 wherein said upper member is fixedly attached to said lower member by means of an adhesive material such as epoxy.

6. The apparatus of claim 1 wherein said pressure transmitting means is a pedestal fixedly attached to said diaphragm extending from the surface of said diaphragm.

7. An apparatus for sensing pressure by using optical evanescent wave coupling between two fiber optic waveguides of the type having a portion of the cladding material removed along a finite length of each of the fiber optic waveguides defining a coupling region for each waveguide, said two fiber optic waveguides having said coupling regions placed in juxtaposition to effectuate optical evanescent wave coupling therebetween, said apparatus comprising:

support means for supporting one of said fiber optic waveguides in a position independent of external pressures, said support means having a longitudinal channel for holding the coupling region of said one of said fiber optic waveguides, the width of said channel being approximately equal to the outer diameter of the coupling region of said one of said fiber optic waveguides, the depth of said channel being less than the outer diameter of the coupling region of said one of said fiber optic waveguides so that said coupling region will protrude beyond the surface of said support means;

upper member fixedly attached to said support means, said upper member having a diaphragm that is responsive to external pressures; and pressure transmitting means fixedly attached to said diaphragm, said pressure transmitting means having a longitudinal channel for holding the coupling region for the other fiber optic waveguide, the width of said channel being approximately equal to the outer diameter of the coupling region of said other fiber optic waveguide, the depth of said channel being less than the outer diameter of the coupling region of said other fiber optic waveguide so that said coupling region will protrude beyond the surface of said pressure transmitting means, said pressure transmitting means being spatially in juxtaposition with said support means such that the axes of said two fiber optic waveguides align and come into slight engagement so that evanescent coupling occurs therebetween and any external pressures upon said diaphragm will cause said pressure transmitting means to force said coupling region of said two fiber optic waveguides into closer communication thus changing the amount of evanescent coupling therebetween.

* * * * *